(12) United States Patent
Heinonen et al.

(10) Patent No.: US 11,261,840 B2
(45) Date of Patent: Mar. 1, 2022

(54) METHOD AND SYSTEM FOR HARNESSING ENERGY FROM MOVING ICE

(71) Applicant: Teknologian tutkimuskeskus VTT Oy, Espoo (FI)

(72) Inventors: Jaakko Heinonen, Espoo (FI); Kari Kolari, Espoo (FI); Lasse Makkonen, Espoo (FI); Maria Tikanmäki, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 0 days.

(21) Appl. No.: 16/760,448

(22) PCT Filed: Oct. 18, 2018

(86) PCT No.: PCT/FI2018/050764
§ 371 (c)(1),
(2) Date: Apr. 30, 2020

(87) PCT Pub. No.: WO2019/086753
PCT Pub. Date: May 9, 2019

(65) Prior Publication Data
US 2020/0284238 A1    Sep. 10, 2020

(30) Foreign Application Priority Data
Nov. 2, 2017  (FI) .................................. 20175971

(51) Int. Cl.
*F03B 17/06*  (2006.01)
*F03B 13/26*  (2006.01)
*B63B 35/44*  (2006.01)

(52) U.S. Cl.
CPC ............ *F03B 17/06* (2013.01); *F03B 13/264* (2013.01); *B63B 2035/4466* (2013.01); *F05B 2220/706* (2013.01); *F05B 2240/93* (2013.01); *F05B 2260/406* (2013.01)

(58) Field of Classification Search
CPC ...... F03B 17/06; F03B 13/264; H02K 7/1853
See application file for complete search history.

(56) References Cited

U.S. PATENT DOCUMENTS

| | | | |
|---|---|---|---|
| 8,393,553 B2 | 3/2013 | Sankrithi et al. | |
| 2004/0130158 A1* | 7/2004 | Kenney | F03G 7/08 290/1 R |
| 2007/0085342 A1* | 4/2007 | Horianopoulos | F03G 7/08 290/1 R |

(Continued)

FOREIGN PATENT DOCUMENTS

| | | |
|---|---|---|
| CN | 1157373 A | 8/1997 |
| CN | 203362426 U | 12/2013 |

(Continued)

*Primary Examiner* — Sean Gugger
(74) *Attorney, Agent, or Firm* — Laine IP Oy (57) ABSTRACT

According to an example aspect of the present invention, there is provided a system for harnessing energy from moving ice, the system comprising a first part configured to move into a first direction under pressure caused by moving ice at least until an ice compression strength is reached and to subsequently move into a second direction, and a second part configured to transform kinetic energy of a cyclic motion of the first part into electric energy.

14 Claims, 6 Drawing Sheets

(56) References Cited

U.S. PATENT DOCUMENTS

2010/0201131 A1* 8/2010 Peralta ............... F03B 13/1855
                                                                        290/54
2011/0198851 A1   8/2011 Lama
2016/0186717 A1   6/2016 Santos
2016/0327013 A1* 11/2016 Koivusaari ........... F03B 13/187

FOREIGN PATENT DOCUMENTS

| CN | 103527391 A | 1/2014 |
|---|---|---|
| JP | H08310483 A | 11/1996 |
| KR | 20130071739 A | 7/2013 |
| RU | SU1641698 A1 | 4/1991 |
| RU | 2010105 C1 | 3/1994 |
| RU | 2137669 C1 | 9/1999 |
| RU | 2154713-02 | 8/2000 |

* cited by examiner

| Ice speed (cm/s) | Hours in 2001 | Hours in 2002 | Hours in 2003 | Hours total |
|---|---|---|---|---|
| 0 | 520 | 460 | 1037 | 2016 |
| $0 < v \leq 5$ | 113 | 197 | 127 | 437 |
| $5 < v \leq 10$ | 191 | 303 | 60 | 553 |
| $10 < v \leq 15$ | 91 | 99 | 31 | 220 |
| $15 < v \leq 20$ | 78 | 100 | 44 | 221 |
| $20 < v \leq 25$ | 36 | 22 | 9 | 67 |
| $25 < v \leq 30$ | 16 | 17 | 14 | 46 |
| $35 < v \leq 40$ | 0 | 6 | 0 | 6 |
| $v > 40$ | 0 | 22 | 0 | 22 |
| Drift hours | 524 | 765 | 283 | 1572 |
| Percent of drift | 50% | 62% | 21% | 44% |
| Total season length (months) | 4 | 4.4 | 5 | 13.4 |
| Estimated amount of drift (months) | 2 | 2.7 | 1 | 5.7 |

METHOD AND SYSTEM FOR HARNESSING ENERGY FROM MOVING ICE

FIELD

The present invention relates to a system for harnessing energy from moving ice. Further, the present invention relates to a method for harnessing energy from moving ice. Furthermore, the present invention relates to a computer readable memory. Additionally, the present invention relates to a computer program.

BACKGROUND

Harnessing energy from offshore waves, wind and tides is a promising way to a clean future and is already widely used. However, one important source of energy has not been utilized in large scale yet. Ice is drifting due to sea currents and wind. In ice-infested waters, a moving ice cover offers a huge additional source of kinetic energy. For harnessing energy from moving ice significant technological challenges need to be solved. In the ice-structure interaction process fraction and friction play a significant role.

Document SU 1641698 A1, for example, describes a floating power plant. The floating power plant has a housing with sections above the waterline and under the waterline. The floating power plant is fixed to the sea bottom in an upright position with the help of guide ropes. The housing is tapered downwards along a vertical axis. The interaction of a drifting ice field with a spiral body of the housing causes the housing to rotate around the vertical axis. The rotation is used to generate electric power via a cogwheel, a gear unit, and electric generators. The electric power is generated in areas where there are constant drifting ice-fields.

Other approaches try to benefit from temperature differences below and above the ice cover. For example, document U.S. Pat. No. 8,393,553 B2 discloses a floating ice sheet based renewal thermal energy harvesting system for use in polar regions. The system can harvest energy from naturally occurring temperature differential between liquid water below a floating ice sheet that is substantially at the freezing temperature of water, and colder air above the floating ice sheet.

In view of the foregoing, it would be beneficial to provide a method and system for harnessing energy from ice. The system should be capable of being manufactured in industrial scale.

SUMMARY OF THE INVENTION

The invention is defined by the features of the independent claims. Some specific embodiments are defined in the dependent claims.

According to a first aspect of the present invention, there is provided a system for harnessing energy from moving ice, the system comprising a first part configured to move into a first direction under pressure caused by moving ice at least until an ice compression strength is reached and to subsequently move into a second direction, and a second part configured to transform kinetic energy of a cyclic motion of the first part into electric energy.

Various embodiments of the first aspect may comprise at least one feature from the following bulleted list:
- the first part comprises at least one piston configured to travel in a cylinder
- the second part comprises a pressure accumulator, a hydraulic motor, and a generator
- at least a portion of the first part is arranged outside of an object having an outer surface
- the second part is arranged within the object
- the object comprises a light house, a wind power plant, a wave power plant, a pier, a buoy, a platform, a drilling platform, a structure of a bridge, or any other structure which provides the outer surface extending through a water surface
- at least the portion of the first part being arranged outside of the object is configured to move along the outer surface of the object
- at least the portion of the first part is configured to float on a water surface
- at least a portion of the first part is configured to be heated
- the system is configured to reduce a load on the object by the cyclic motion of the first part
- the system comprises a computing device configured to control the cyclic motion of the first part
- the system comprises at least one force sensor capable of measuring a force on the first part
- the system is configured to adjust a stiffness of a hydraulic cylinder According to a second aspect of the present invention, there is provided a method for harnessing energy from moving ice, the method comprising moving a first part of a system into a first direction under pressure caused by moving ice at least until an ice compression strength is reached, subsequently moving the first part of the system into a second direction, and transforming kinetic energy of a cyclic motion of the first part into electric energy.

Various embodiments of the second aspect may comprise at least one feature from the following bulleted list:
- at least one piston is cyclically moved in a cylinder
- transforming kinetic energy of a cyclic motion of the first part into electric energy takes place using a pressure accumulator, a hydraulic motor, and a generator as a second part of the system
- the method further comprising arranging at least a portion of the first part outside of an object having an outer surface
- arranging a second part within the object
- the method yet further comprising moving at least the portion of the first part being arranged outside of the object along the outer surface of the object
- at least a portion of the first part is heated
- a load on the object is reduced by cyclically moving the first part
- the first direction is opposite to the second direction According to a third aspect of the present invention, there is provided a non-transitory computer readable medium having stored thereon a set of computer readable instructions that, when executed by at least one processor, cause a system to at least move a first part of the system into a first direction under pressure caused by moving ice until an ice compression strength is reached, move the first part of the system into a second direction subsequent to reaching the ice compression strength, and transform kinetic energy of a cyclic motion of the first part into electric energy.

Various embodiments of the third aspect may comprise at least one feature corresponding to a feature from the preceding bulleted list laid out in connection with the second aspect.

According to a fourth aspect of the present invention, there is provided a computer program configured to cause a method in accordance with at least one of claims 13-20 to be performed.

Considerable advantages are obtained by certain embodiments of the invention. A method and system for harnessing energy from moving ice are provided. In ice-infested waters, the moving ice cover offers a huge source of kinetic energy. According to certain embodiments of the present invention, the kinetic energy of the moving ice can be transformed into electric energy. Calculations show that the crushing power of 30 centimetre thick ice crushing against a 10 m wide structure can be about 1000 kW, for instance. Thus, clean, green and renewable energy can be provided by cyclically moving a part of the system in accordance with at least some embodiments of the present invention and transforming the kinetic energy into the electric energy.

Further, the system according to at least some embodiments of the present invention may be integrated with other offshore structures planned for other purposes, especially wind turbines. In such a case, not only energy can be produced, but also ice-induced loads on any support structures can be reduced by use of the system. Studies have shown that about 30% more energy can be harnessed by combining the system according to certain embodiments of the present invention with e.g. wave power plants or offshore wind power plants. Additionally, at least some embodiments of the present invention also shield an object or an offshore structure from moving ice by working as a damper, thus decreasing damages and/or vibrations.

In particular, a combination of the system according to certain embodiments of the present invention with wind power units is beneficial, because an electric grid is typically already available, a 30% power increase of nominal power can be provided according to at least some embodiments, and the system shields the wind power units from moving ice. Such wind power units in ice-infested waters exist, for example, in the Baltic Sea, the Lake Erie, and the Bohai Bay.

BRIEF DESCRIPTION OF THE DRAWINGS

For a more complete understanding of particular embodiments of the present invention and their advantages, reference is now made to the following descriptions, taken in conjunction with the accompanying drawings. In the drawings.

EMBODIMENTS

Figure 1:
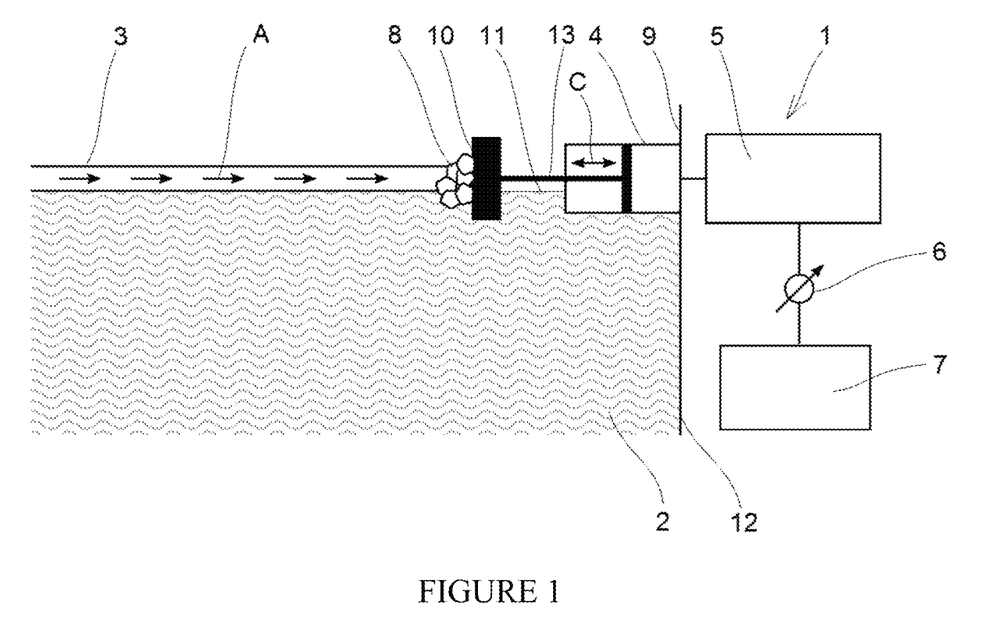
FIG. 1 illustrates a schematic view of a system for harnessing energy from moving ice in accordance with at least some embodiments of the present invention.

In FIG. 1 a schematic view of a system 1 for harnessing energy from moving ice 3 in accordance with at least some embodiments of the present invention is illustrated. The ice 3 is moving with a specific velocity towards the system 1 as indicated by arrows A. The system 1 comprises a first part which is configured to move into a first direction under pressure caused by the ice 3 moving against a contact surface 10 of the first part of the system 1. The first part may, for example, comprise a piston 13 arranged in a hydraulic cylinder 4. The contact surface 10 is configured to be brought into contact with ice 3 floating on a water surface 11. The first direction is typically orientated towards an object 9. The first part is configured to be moved into the first direction until an ice compression strength is reached. At the ice compression strength the ice 3 fractures. Due to local stresses in the ice mass cracks are formed, further leading to the breakup of the ice mass into chunks. The ice crushes only in a local area which is called as "compression zone" 8 in this document. The uniaxial compressive strength of ice 3 may range between 2-25 MPa, especially between 5-10 MPA, for instance. The compression strength of ice 3 depends on various parameters such as temperature, strain rate, volume, and ice grain size. Typically, the compression strength of ice 3 increases with decreasing temperature. The compressive strength of ice 3 is strain rate sensitive. Ductile behaviour at low and intermediate strain rates, but brittle behaviour at higher strain rates has been observed. Typically, the breakup takes place rapidly and the pressure on the contact surface 10 decreases. In other words, the first part is moved into the first direction towards the object 9 due to ice 3 drifting against the contact surface 10. The ice 3 pushes the cylinder piston 13 until the ice compression strength is reached and the ice crushes.

The first part is further configured to move into a second direction subsequent to reaching the ice compression strength. The second direction is opposite to the first direction. Crushing of the ice releases the piston 13 and thus also the contact surface 11 back to its original position for the next interaction cycle.

At least a portion of the movable first part is arranged outside of an object 9 having an outer surface 12. The object 9 may be e.g. a light house, a wind power plant, a wave power plant, a pier, a buoy, a platform, a drilling platform, a structure of a bridge, or any other structure which provides an outer surface 12 extending through a water surface 10.

At least the portion of the movable first part which is arranged outside of the object 9 may be configured to move in vertical direction along the outer surface 12 of the object 9 in order to adjust the height of the contact surface 10 of the first part depending on the water level. For example, at least the portion of the movable first part may be configured to float on a water surface 10 or to move along a rail (not shown) coupled to the outer surface 12 of the object 9.

A second part of the system 1 is configured to transform kinetic energy of the cyclic motion of the first part into electric energy. Typically, the second part is arranged within the object 9. The alternating motion of the piston 13 is transformed to electricity through a power take-off system. The power take-off system comprises a pressure accumulator 5, a hydraulic motor 6, and an electric generator 7, for instance. The pressure accumulator may be configured to store energy over a few interaction cycles. Thus, irregularities in the crushing pressures of subsequent cycles can be smoothed out. The pressure accumulator 5 is connected to a hydraulic motor 6 that drives the generator 7.

As the system 1 is integrated with another object 9, for example a structure of a wind turbine, not only energy can be produced, but also ice-induced loads on the support structure can be reduced. The system 1 also shields the object 9 from the moving ice 3 by working as a damper. Thus, the material strength of the outer wall including the outer surface 12 may be decreased due to the cyclic motion of the first part of the system 1, for instance.

According to certain embodiments, at least a portion of the first part is configured to be heated in order to break free the respective portion from a stuck position due to frozen conditions.

Figure 2:
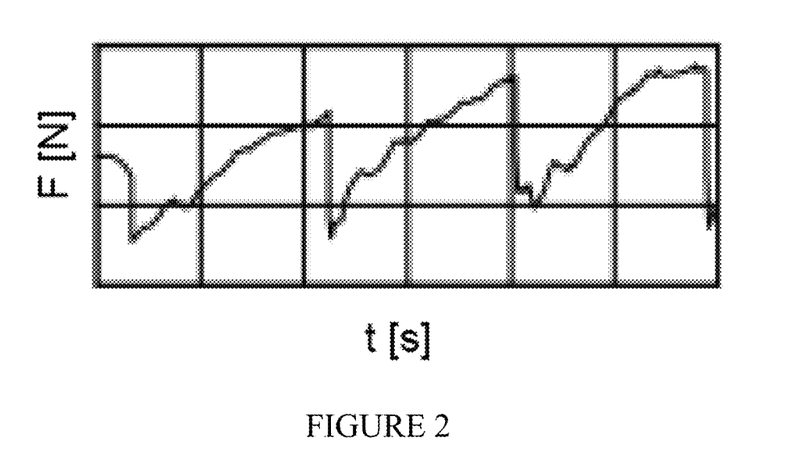
FIG. 2 illustrates a time-force-diagram.

In FIG. 2 a time-force-diagram is illustrated. The force F of moving ice 3 on a contact surface 10 coupled to a cylinder piston 13 has been measured. It can be seen that the force F increases from a minimum force value to a maximum force value over time t while the first part moves into the first direction before the force F starts to decrease abruptly. At the maximum force value the ice compression strength is reached and the ice 3 crushes locally in the compression zone 8. Subsequently, the force value abruptly decreases to a new minimum force value and the first part moves into the second direction. Then, new moving ice 3 has arrived at the contact surface 10 and in the next cycle the force F increases again from a minimum force value to a maximum force value over time t before the force F starts to decrease again abruptly.

Figure 3:
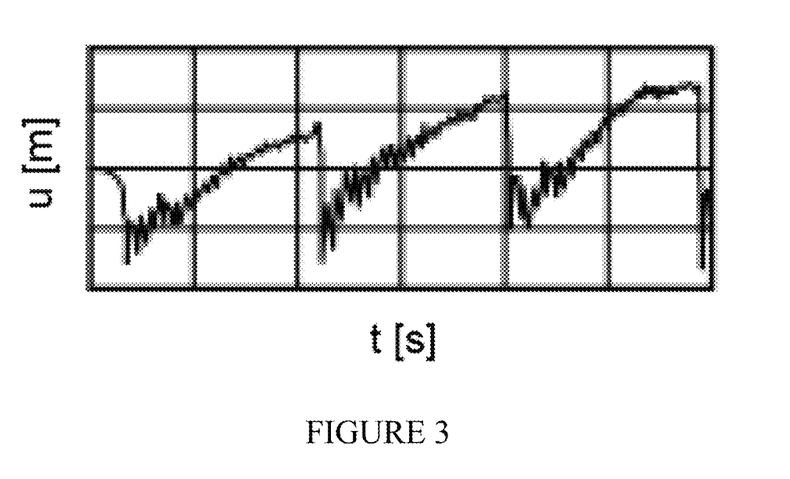
FIG. 3 illustrates a time-displacement-diagram.

In FIG. 3 a time-displacement-diagram is illustrated. The displacement u of a contact surface 10 coupled to a cylinder piston 13 due to moving ice exerting 3 a force F on the contact surface 10 as shown in FIG. 2 has been measured. It can be seen that the displacement u increases from a minimum displacement value to a maximum displacement value over time t while the first part moves into the first direction before the displacement starts to decrease abruptly. At the maximum displacement value the ice compression strength is reached and the ice 3 crushes locally in the compression zone 8. Subsequently, the displacement value decreases abruptly to a new minimum displacement value and the first part moves into the second direction. Then, intact moving ice 3 has arrived at the contact surface 10 and in the next cycle the displacement u increases again from a minimum displacement value to a maximum displacement value over time t before the displacement u starts to decrease again abruptly.

Figure 4:
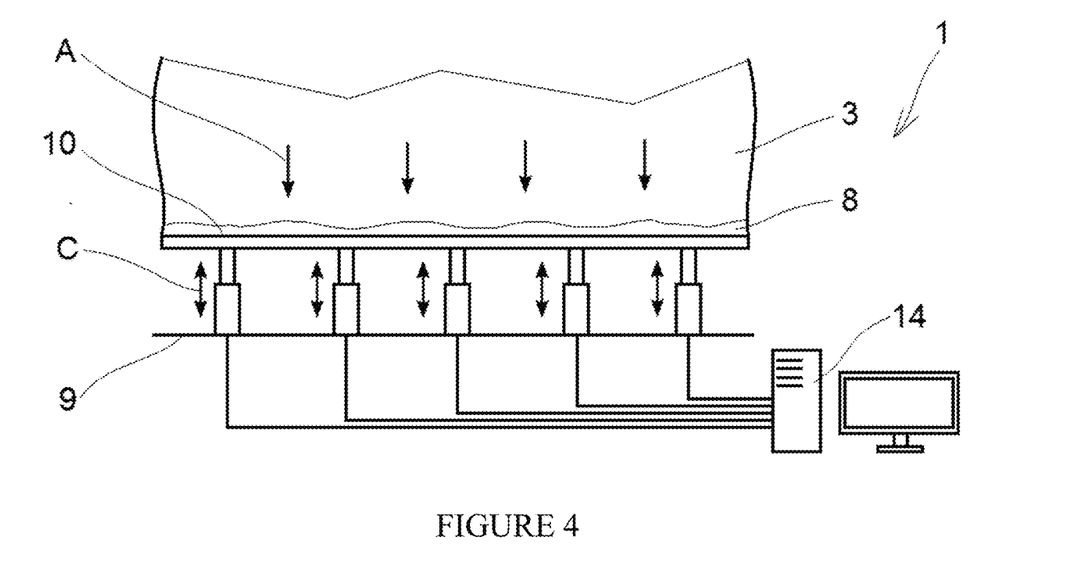
FIG. 4 illustrates a schematic view of another system for harnessing energy from moving ice in accordance with at least some embodiments of the present invention.

In FIG. 4 a schematic view of another system 1 for harnessing energy from moving ice 3 in accordance with at least some embodiments of the present invention is illustrated. The ice 3 is moving with a specific velocity towards the system 1 as indicated by arrows A. The system 1 comprises a first part which is configured to move into a first direction under pressure caused by the ice 3 moving against a contact surface 10 of the first part of the system 1. The first part is further configured to move into a second direction subsequent to reaching the ice compression strength. The second direction is opposite to the first direction as indicated by arrow C. The first part may, for example, comprise a plurality of hydraulic cylinders coupled to a plate-like structure. The plate-like structure comprises the contact surface 10. The contact surface 10 is configured to be brought into contact with the drifting ice 3. The first part of the system 1 is arranged outside of an object 9. A second part (not shown) of the system 1 is configured to transform kinetic energy of the cyclic motion of the first part into electric energy. Typically, the second part is arranged within the object 9. The alternating motion of the hydraulic cylinders is transformed to electricity through a power take-off system (not shown).

The system 1 further comprises a computing device 14 including a non-transitory computer readable medium having stored thereon a set of computer readable instructions that, when executed by at least one processor, cause the system 1 to at least move the first part of the system 1 into the first direction under the pressure caused by the moving ice 3 until an ice compression strength is reached, move the first part of the system 1 into the second direction subsequent to reaching the ice compression strength, and transform kinetic energy of the cyclic motion of the first part into electric energy.

According to certain embodiments, the system 1 comprises at least one force sensor capable of measuring a force on the first part, in particular on the contact surface 10. The system 1 further comprises a computing device 14 configured to control the cyclic motion of the first part. The stiffness of the hydraulic cylinders may be adjustable, for instance. In other words, a continuous or stepwise configuration of the stiffness of the hydraulic cylinders may be performed. I.e., the stiffness of the hydraulic cylinders can be varied based on the measured force(s) acting upon the contact surface 10. The force signal(s) may act as input signal(s) for the computing device 14 in order to control the cyclic motion of the hydraulic cylinders. Thus, the system 1 can be used under varying ice-conditions, i.e. conditions depending on varying ice thickness, drift speed, etc.

The input power can be estimated based on experimental knowledge on the ice pressure during the ice-structure interaction. For example, the width of the contact surface 10 may be 10 m, the ice thickness may be 0.3 m, the drift speed of the ice 3 may be 0.175 m/s, and the average crushing pressure may be 2 MPa. Thus, the theoretical input power is as follows:

$$W_{inp} = 0.175 \frac{m}{s} * 2 * 10^6 \frac{N}{m^2} * 0.3 \, m * 10 \, m \approx 1 \, MW$$

Figure 5:
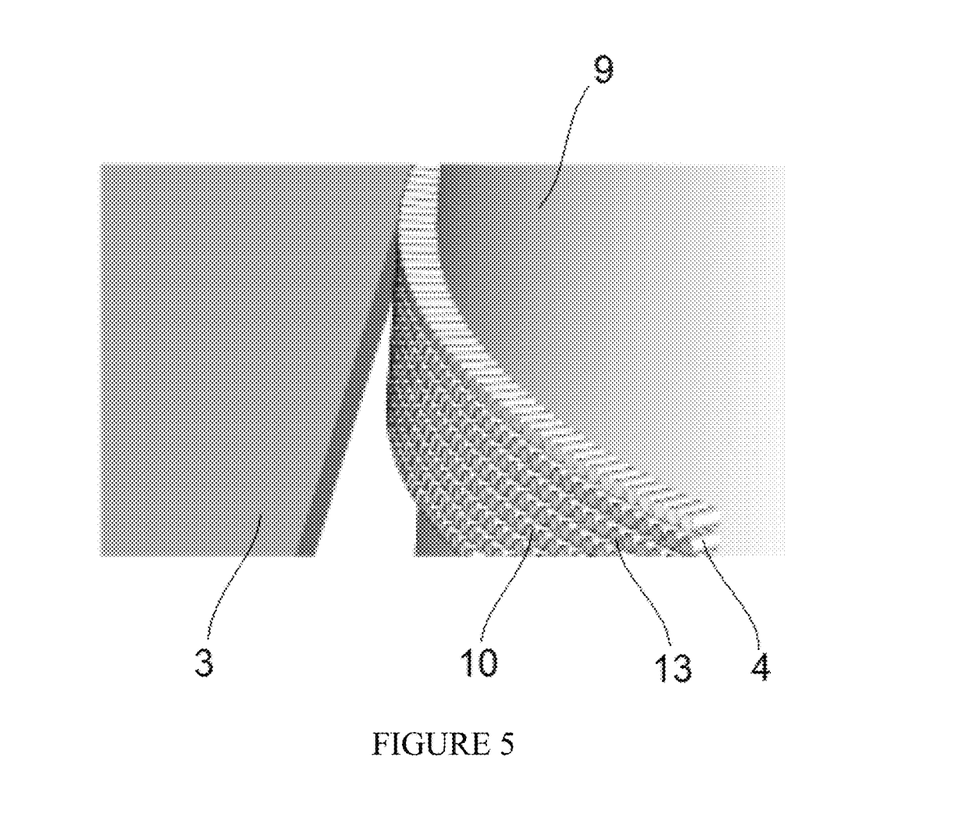
FIG. 5 illustrates a schematic view of a further system for harnessing energy from moving ice in accordance with at least some embodiments of the present invention.

In FIG. 5 a schematic view of a further system 1 for harnessing energy from moving ice 3 in accordance with at least some embodiments of the present invention is illustrated. A part of an object 9 is covered by a plurality of harnessing pistons 13. The object 9 is formed at least partially annularly and may be, for example, a support structure of a wind power plant. A central axis of each harnessing piston 13 is arranged substantially parallel to a water surface, i.e. the central axis of each harnessing piston 13 is orientated horizontally. The central axis of each harnessing piston 13 is further arranged substantially perpendicular to a central axis of the object 9, i.e. the central axis of the object 9 is orientated vertically.

Different forces on the contact surfaces 10 of the respective pistons 13 in different local areas can be taken into consideration by covering a large surface of the object 9 with the plurality of harnessing pistons 13. For example, the stiffness of each hydraulic cylinder may be controlled independently. Additionally, changes in the water level can be taken into consideration by covering a sufficient outer surface area of the object 9 with the plurality of harnessing pistons 13. Thus, at least some of the plurality of harnessing pistons 13 can be brought into contact with the ice 3 regardless of the tide.

Figure 6:
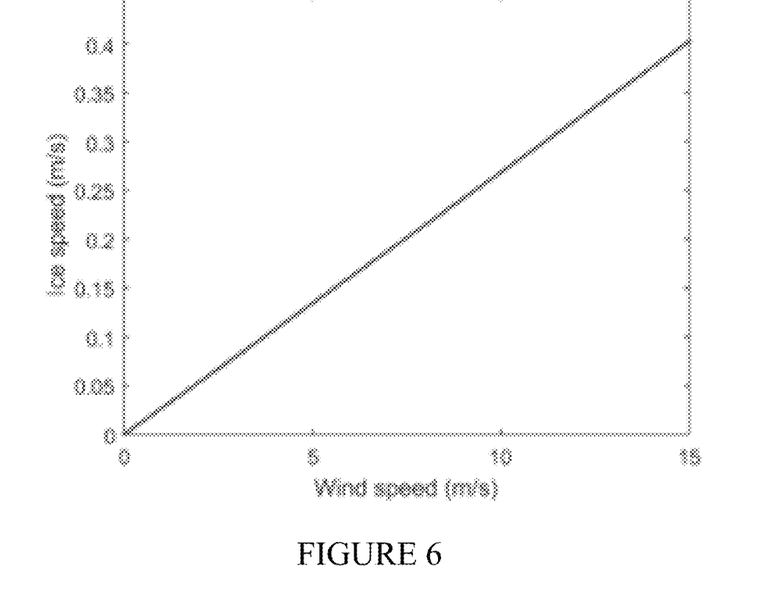
FIG. 6 illustrates a wind speed-ice speed-diagram.

In FIG. 6 a wind speed-ice speed-diagram is illustrated. The speed of an ice floe as a function of wind speed based on the free-drift assumption is shown. Ice velocity can be estimated by using the dynamical equations according to Leppäranta (1981). By ignoring ice deformations, Coriolis force, rotational ice inertia, sea surface tilting and by assuming the ice floe movement to be in the same direction as the wind and water flow, the dynamic equation can be simplified as $$ma = F_a + F_w,$$

where m is the mass of ice floe, a is the acceleration, $F_a$ is the driving force from wind and $F_w$ is the driving force from the sea current. The previous equation can be written for a unitary ice surface area as $$\rho_i h \frac{dv}{dt} = \tau_a + \tau_w,$$

where $\tau_a$ and $\tau_w$ are the shear stresses due to the wind driving force and the sea current driving force. The shear stresses are defined as $$\tau_a = \rho_a c_a |w-v|(w-v)$$

$$\tau_w = \rho_w c_w |w_w-v|(w_w-v),$$

where $\rho_a$ and $\rho_w$ are the densities of air and water and respectively $c_a$ and $c_w$ are roughness coefficients at ice surface, w is the wind velocity and $w_w$, is the velocity of the sea current. In the Bothnian Bay, sea currents are mostly small and can be neglected, for instance. Consequently, the ice speed is a linear function depending on the wind speed as shown in FIG. 6.

Figure 7:
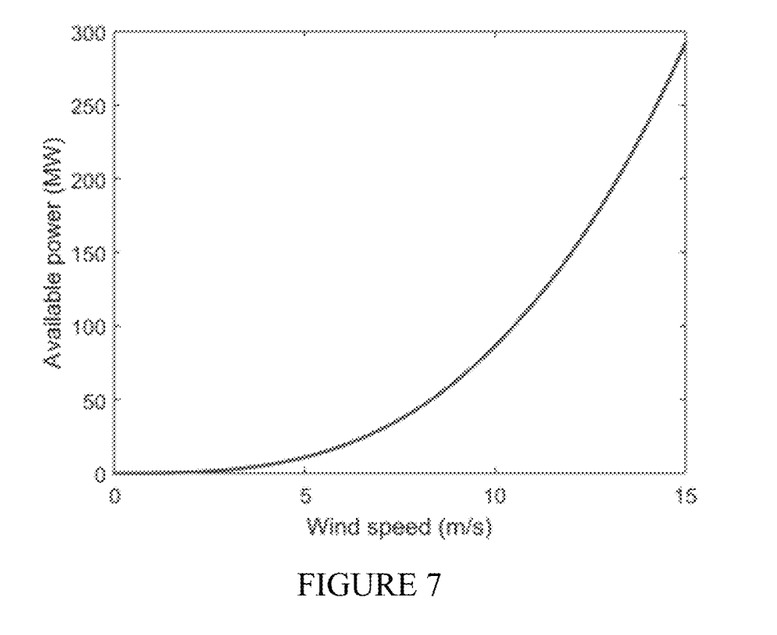
FIG. 7 illustrates a wind speed-available power-diagram.

In FIG. 7 a wind speed-available power-diagram is illustrated. The total area of the Bothnian Bay is about 36800 km² from which about half can be estimated to be drift ice zone. Thus, the total force from the wind to the drifting ice can be calculated. If only 10% of this force could be used by a system for harnessing energy from ice in accordance to at least some embodiments of the present invention, the available power would be as shown in FIG. 7.

Figure 8:
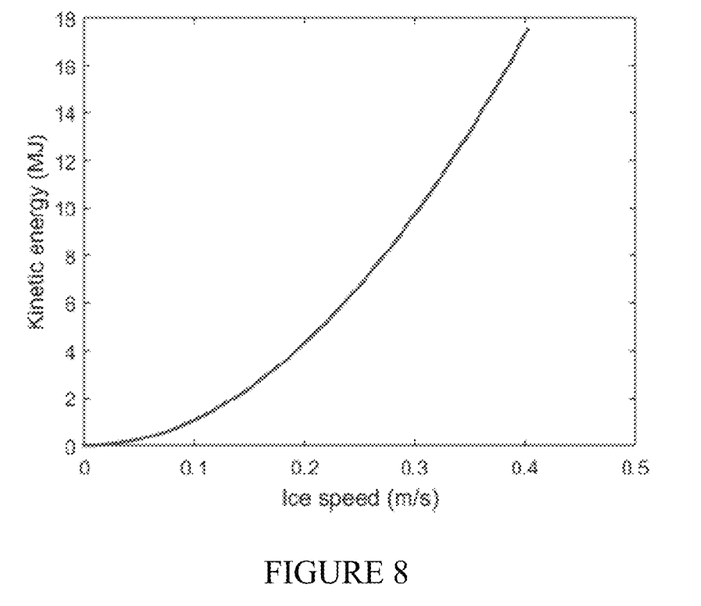
FIG. 8 illustrates an ice speed-kinetic energy-diagram.

FIG. 8 an ice speed-kinetic energy-diagram is illustrated. The kinetic energy of a single freely drifting ice floe having a diameter of 1 [km] and a thickness of 30 [cm] is shown as a function of the ice speed. If the diameter of the ice floe is multiplied by 10 then the kinetic energy will be multiplied by 100, i.e. E~d².

Figure 9:
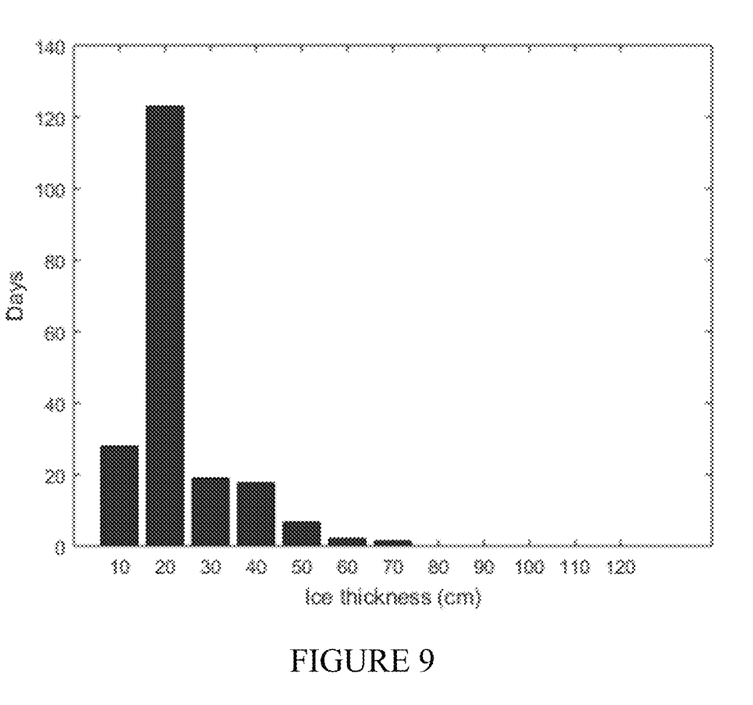
FIG. 9 illustrates an example of an ice thickness-days-diagram.

In FIG. 9 an example of an ice thickness-days-diagram is illustrated. An average amount of days when certain ice thicknesses were present per year at the Norströmsgrund area in 2007-2015 is shown. The Norströmsgrund area is located about 60 km offshore Luleå. The values represent an average amount of ice days per winter. It can be seen that the ice thickness has been mostly in the region between 10 cm and 20 cm. The maximum ice thickness has been in the region between 60 cm and 70 cm.

Figure 10:
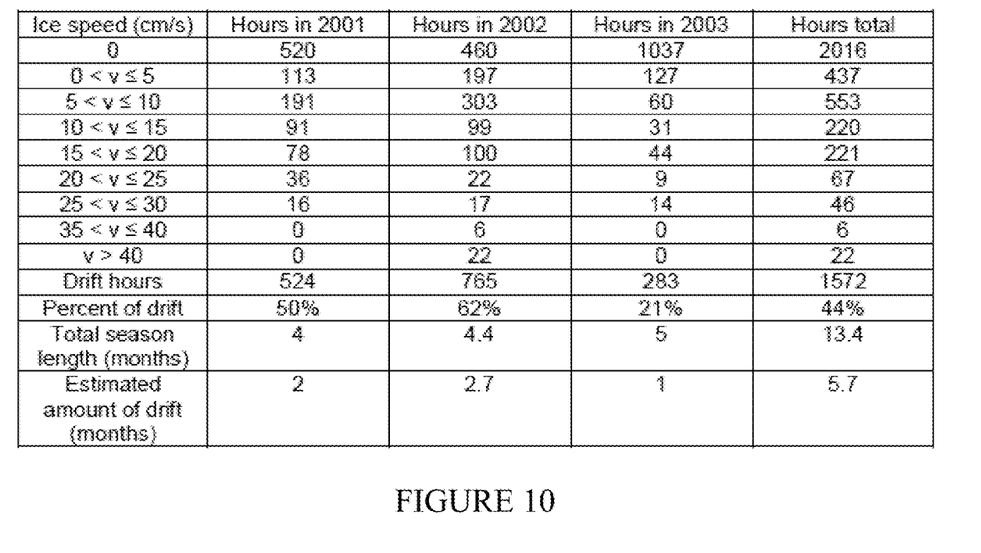
FIG. 10 illustrates a table of ice drift speeds measured at the Norströmsgrund lighthouse in the years 2001-2003.

In FIG. 10 a table of ice drift speeds measured at the Norströmsgrund lighthouse in the years 2001-2003 is illustrated. The length of the ice season in these years was between about 4 and 5 months per year and on average 134 days per year. It can be seen from the table that in the ice season 2001-2002 up to 62% of the time ice was present in the Bothnian Bay kinetic energy could have been transformed into electric energy from drifting ice by a system in accordance with at least some embodiments of the present invention.

Figure 11:
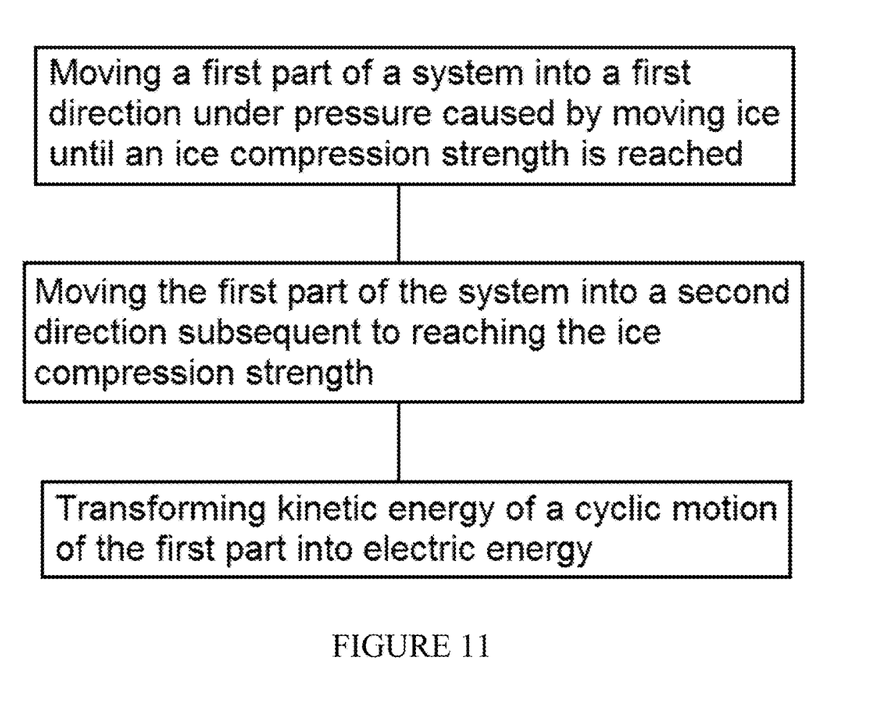
FIG. 11 illustrates a flow chart of a method in accordance with at least some embodiments of the present invention.

In FIG. 11 a flow chart of a method in accordance with at least some embodiments of the present invention is illustrated. The method comprises moving a first part of a system 1 into a first direction under pressure caused by moving ice 3 until an ice compression strength is reached. At this point the ice crushes. The method further comprises moving the first part of the system 1 into a second direction subsequent to reaching the ice compression strength. The second motion may be, for example, performed by use of a hydraulic cylinder. Kinetic energy can then be transformed from the cyclic motion of the first part into electric energy.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in harnessing energy.

REFERENCE SIGNS LIST 1 system
2 water
3 ice
4 cylinder
5 pressure accumulator system
6 hydraulic motor
7 generator
8 compression zone
9 object
10 contact surface
11 water surface
12 outer surface
13 piston
14 computing device
A direction of moving ice
C cyclical motion

CITATION LIST

Patent Literature

SU 1641698 A1
U.S. Pat. No. 8,393,553 B2

The invention claimed is:

1. A system for harnessing energy from moving ice, the system comprising:
   a first part comprising at least one piston configured to travel in a hydraulic cylinder, wherein the system is configured to move the piston into a first direction under pressure caused by moving ice at least until an ice compression strength is reached in an ice compression zone and to subsequently move the piston into an opposite second direction,
   at least one force sensor capable of measuring a force on a contact surface of the first part in the ice compression zone,
   a computing device configured to control the movement of the piston based on the measured force, and
   a second part comprising a pressure accumulator, a hydraulic motor, and a generator and configured to transform kinetic energy of a cyclic motion of the piston into electric energy.

2. The system according to claim 1, wherein at least a portion of the first part is arranged outside of an object having an outer surface and the second part is arranged within the object.

3. The system according to claim 2, wherein the object comprises a light house, a wind power plant, a wave power plant, a pier, a buoy, a platform, a drilling platform, a structure of a bridge, or any other structure which provides the outer surface extending through a water surface.

4. The system according to claim 2, wherein at least the portion of the first part being arranged outside of the object is configured to move along the outer surface of the object.

5. The system according to claim 2, wherein at least the portion of the first part is configured to float on a water surface.

6. The system according to claim 2, wherein at least the portion of the first part is configured to be heated.

7. The system according to claim 2, wherein the system is configured to reduce a load on the object by the cyclic motion of the first part.

8. The system according to claim 1, wherein the system is configured to adjust a stiffness of the hydraulic cylinder.

9. A method for harnessing energy from moving ice, the method comprising:
   moving a piston of a first part of a system into a first direction in a hydraulic cylinder under pressure caused by moving ice at least until an ice compression strength is reached in an ice compression zone and subsequently moving the piston into an opposite second direction,
   measuring a force on a contact surface of the first part in the ice compression zone by at least one force sensor,
   controlling the movement of the piston based on the measured force by a computing device, and
   transforming kinetic energy of a cyclic motion of the piston into electric energy by a second part of the system, wherein the second part comprises a pressure accumulator, a hydraulic motor, and a generator.

10. The method according to claim 9, further comprising: arranging at least a portion of the first part outside of an object having an outer surface and arranging the second part within the object.

11. The method according to claim 10, further comprising:
   moving at least the portion of the first part being arranged outside of the object along the outer surface of the object.

12. The method according to claim 9, wherein at least a portion of the first part is heated.

13. The method according to claim 10, wherein a load on the object is reduced by cyclically moving the first part.

14. A non-transitory computer readable medium having stored thereon a set of computer readable instructions that, when executed by at least one processor, cause a system to at least:
   move a first part of the system into a first direction under pressure caused by moving ice at least until an ice compression strength is reached in an ice compression zone, wherein the first part comprises a piston configured to travel in a hydraulic cylinder and subsequently move the first part of the system into an opposite second direction,
   measure a force on a contact surface of the first part in the ice compression zone by at least one force sensor,
   control the movement of the piston based on the measured force by a computing device, and
   transform kinetic energy of a cyclic motion of the first part into electric energy by a second part of the system, wherein the second part comprises a pressure accumulator, a hydraulic motor, and a generator.

* * * * *